United States Patent
Flämig-Vetter et al.

(10) Patent No.: US 6,651,614 B2
(45) Date of Patent: Nov. 25, 2003

(54) METHOD OF OPERATING A DIESEL INTERNAL COMBUSTION ENGINE

(75) Inventors: Tobias Flämig-Vetter, Esslingen (DE); Ulrich Heinl, Ostfildern (DE); Gernot Hertweck, Feilbach (DE); Katsuyoshi Koyanagi, Esslingen (DE); Thomas Mühleisen, Hattenhofen (DE); Heinz Öing, Dörpen (DE); Guido Vent, Oppenweiler (DE); Jürgen Willand, Stuttgart (DE)

(73) Assignee: Daimler Chrysler AG, Stuttgart (DE)

( * ) Notice: Subject to any disclaimer, the term of this patent is extended or adjusted under 35 U.S.C. 154(b) by 66 days.

(21) Appl. No.: 09/965,912

(22) Filed: Sep. 28, 2001

(65) Prior Publication Data

US 2002/0056434 A1 May 16, 2002

(30) Foreign Application Priority Data

Sep. 29, 2000 (DE) .......................... 100 48 238

(51) Int. Cl.⁷ ............................... F02B 31/06
(52) U.S. Cl. ............ 123/301; 123/568.12; 123/568.21; 123/302; 123/305; 123/306
(58) Field of Search ................ 123/295, 299, 123/300, 301, 302, 305, 306, 308, 406.45, 406.47, 406.48, 431, 432, 704, 443, 568.12, 568.21; 701/103, 104, 105, 108

(56) References Cited

U.S. PATENT DOCUMENTS

| 4,256,062 A |   | 3/1981 | Schäfer ..................... 123/308 |
| 4,577,602 A |   | 3/1986 | Showalter ................... 123/306 |
| 4,641,617 A | * | 2/1987 | Aoyama et al. ............. 123/262 |
| 4,944,266 A |   | 7/1990 | Hasegawa et al. .......... 123/302 |
| 5,150,677 A |   | 9/1992 | Aoyama ...................... 123/302 |
| 5,186,139 A | * | 2/1993 | Matsura ....................... 123/301 |
| 5,549,087 A | * | 8/1996 | Gray et al. .................. 123/254 |
| 5,740,775 A | * | 4/1998 | Suzuki et al. ............... 123/299 |
| 5,875,743 A | * | 3/1999 | Dickey ...................... 123/25 C |
| 5,896,840 A | * | 4/1999 | Takahashi ................... 123/295 |
| 6,092,502 A | * | 7/2000 | Atago et al. ................ 123/301 |
| 6,178,942 B1 | * | 1/2001 | di Priolo et al. ............ 123/273 |
| 6,213,086 B1 | * | 4/2001 | Chmela et al. ............. 123/276 |
| 6,273,056 B1 | * | 8/2001 | Shirakawa et al. ......... 123/305 |
| 6,286,482 B1 | * | 9/2001 | Flynn et al. ................ 123/435 |
| 6,334,427 B1 | * | 1/2002 | Nakayama et al. ......... 123/305 |
| 6,336,438 B1 | * | 1/2002 | Durnholz et al. ........... 123/301 |
| 6,412,469 B1 | * | 7/2002 | Itoyama et al. ............. 123/299 |
| 6,530,361 B1 | * | 3/2003 | Shiraishi et al. ............ 123/435 |
| 2002/0020388 A1 | * | 2/2002 | Wright et al. ............... 123/304 |

FOREIGN PATENT DOCUMENTS

| DE | 100 32 232 | 2/2001 |         |
| EP | 0 732 485  | 9/1996 |         |
| EP | 0 967 380  | 12/1999 |        |
| EP | 1 001 146  | 5/2000 |         |
| FR | 2 801 638  | 6/2001 |         |
| GB | 2 328 716  | 3/1999 |         |
| JP |    267318  | * 11/1990 | .......... F02B/31/00 |
| JP |    288038  | * 10/1998 | .......... F02B/31/00 |

* cited by examiner

Primary Examiner—Hieu T. Vo
Assistant Examiner—Hai Huynh
(74) Attorney, Agent, or Firm—Klaus J. Bach

(57) ABSTRACT

In a method of operating a diesel internal combustion engine, wherein a homogeneous mixture is formed in the combustion space before a spontaneous ignition by means of fuel injected directly into separately supplied combustion air, which combustion air is admitted to the combustion space in a swirling flow about the longitudinal axis of the cylinder that can be adjusted as regards its swirl intensity by a control element. A control unit adjusts the swirl intensity in a manner coordinated with the injection parameters to provide a homogeneous mixture igniting at a predetermined point for highly effective engine operation with low emissions.

12 Claims, 2 Drawing Sheets

METHOD OF OPERATING A DIESEL INTERNAL COMBUSTION ENGINE

BACKGROUND OF THE INVENTION

The invention relates to a method of operating a diesel internal combustion engine wherein fuel is injected into the combustion chamber of the engine to form a homogenous air/fuel mixture for the combustion of the fuel in the combustion chamber.

The prior art includes diesel internal combustion engines in which each cylinder is provided with an injector for direct fuel injection into the combustion space formed in the cylinder. The fuel is burnt with separately supplied combustion air, the compression of the air/fuel mixture by the piston triggering spontaneous ignition. Increasingly higher requirements are being made for low pollutant emissions from modern diesel internal combustion engines. The legally prescribed limits for pollutant emissions can often only be met by complex devices for aftertreatment of the exhaust gas, such as particle filters or catalystic converters. In particular, although influencing the diesel-specific ignition delay leads to a reduction in the emissions of nitrous gases, the generation of black smoke remains uncontrollable. Although particulate emissions can be reduced by optimizing fuel injection, for example with an increased injection pressure, this increases the combustion temperature and thus promotes the formation of nitrogen oxides.

EP 0 967 380 A2 discloses a method of operating a diesel internal combustion engine in which a reduction in pollutant emissions and, at the same time, in the generation of black smoke is to be achieved by the formation of a homogeneous mixture of fuel and combustion air. In this so-called pre-mixed mixture formation, the mixture is configured in such a way that a homogeneous mixture is formed in the combustion space no later than the time of spontaneous ignition, i.e. a largely uniform mixture ratio between the fuel and the combustion air exist in the combustion space. The fuel is injected into the combustion space at an early point in time during the compression stroke of the piston, and the mixture ignites at the end of the compression stroke.

By means of this combustion method, as in spark initiated-ignition internal combustion engines, the development of black smoke can be prevented and, at the same time, the formation of nitrous gases can be suppressed, thereby providing for reduced fuel consumption as well. In order to achieve the desired homogeneous mixture formation, the known method provides for a pre-injection of fuel in a period between the beginning of the the intake stroke and the middle part of the compression stroke of the piston and a subsequent main fuel injection. A control unit monitors the injection process involved in the two-part injection as a function of the operating state of the internal combustion engine. Here, the formation of black smoke is to be prevented by the fact that the main injection takes place repeatedly in a time interval at the end of the compression stroke and the beginning of the expansion stroke. Combustion is to be stabilized by taking account of the temperature of the fresh intake air.

It is the object of the invention to provide a method of operating a diesel internal combustion engine by which very low pollutant emissions can be achieved in combination with a uniform homogenized mixture formation.

SUMMARY OF THE INVENTION

In a method of operating a diesel internal combustion engine, wherein a homogeneous mixture is formed in the combustion space before a spontaneous ignition by means of fuel injected directly into separately supplied combustion air, the combustion air is admitted to the combustion space in a swirling flow about the longitudinal axis of the cylinder that can be adjusted as regards its swirl intensity by a control element. A control unit adjusts the swirl intensity in a manner coordinated with the injection parameters to provide a homogeneous mixture for highly effective engine operation with low emissions.

With this method, the mixture formation is completely finished with virtually uniform air ratios throughout the entire combustion space before the start of ignition. This prevents diffusive combustion. The homogenization of the mixture is varied by the control unit as a function of the engine operating conditions. The control element, which can be controlled for this purpose by the control unit, is preferably a control flap, which is arranged in an inlet duct of each cylinder. The swirl intensity of the combustion air flow, which comprises the component flows of both inlet ducts, can be adjusted to the desired value by restricting the inlet air flow in one inlet duct by means of the control flap arranged in the respective inlet duct.

Homogenization of the fuel/air mixture is achieved in combination with swirl control by the determination of the injection point and the quantity of fuel to be injected by the control unit. The quantity of fuel to be injected is dispensed, preferably, essentially in a continuous injection process of the injector. With the method according to the invention, a staggered pre- or pilot injection before the main injection is of no benefit since the maximum ignition delay of the diesel internal combustion engine can be achieved by combining control of the injection parameters with a control of the swirl intensity. It is regarded as particularly expedient if the injection process begins in a time window between about 30–40° of crank angle before the top dead center of the crank shaft and ends about 10–20° of crank angle after top dead center.

The introduction of the fuel provided for combustion takes place by a main injection and the fuel is preferably injected by the injector in a continuous injection process. To ensure a further reduction in pollutant emissions, especially post-oxidation of HC, CO and particulates, a staggered after injection can be provided, during which the proportion of the total quantity injected is smaller than the proportion in the main injection.

In an advantageous embodiment of the invention, a specific air ratio between the oxygen content of the combustion air and the quantity of fuel is set by recirculating exhaust gas at an adjustable recirculation rate. It is advantageous here if an air ratio specified for the respective operating point of the internal combustion engine is set. Such application values can be determined in advance, as can the settings of the swirl intensity and the injection parameters, and stored in a performance graph of the control unit for access as needed. At least in certain operating ranges of the internal combustion engine, the air ratio is set to values close to the stoichiometric ratio. This results in particularly low nitrogen oxide emissions.

The optimum recirculation rate, i.e. the proportion in the combustion air of exhaust gases recirculated and added to the fresh intake air, is determined by the control unit through appropriate adjustment of an exhaust-gas recirculation valve, which is arranged in an exhaust-gas recirculation line between the exhaust line and the inlet line of the internal combustion engine. By coordinated adjustment of the injection point, the swirl intensity of the combustion air flow and of the air ratio by means of the exhaust-gas recirculation rate to a specified value, the control unit can adjust the balance of conversion during combustion of the fuel to the optimum values. The control unit also specifies the course of combustion and the pressure gradient in the combustion space to provide values as a function of the engine operating point by means of associated settings of the air ratio, the swirl intensity of the combustion air flow and the injection parameters.

The method according to the invention provides a largely fully homogenous mixture in the ignition delay phase. It is possible with the method to establish a leaner-than-stoichiometric air ratio between the combustion air (fresh air/exhaust gas mixture) and the injected fuel. This mixture ignites in local zones with an almost stoichiometric air/fuel ratio. The ignition delay phase can be set to the optimum length for the operating point by means of the parameters that can be adjusted according to the invention, namely the injection rate, the injection point, the fresh air/exhaust gas ratio and the swirl intensity. In the process, the desired homogenization of the mixture and the position and size of the zones with ignition nuclei of an approximately stoichiometric mixture ratio are controlled. The premixing of the fuel with the combustion air, i.e. the completion of mixture formation before ignition, results in complete and low-soot combustion.

In a manner similar to internal combustion engines with spark ignition, it is possible in diesel internal combustion engines to achieve an air ratio close to the stoichiometric value to thereby eliminating the conflict between the aims of reducing particulate emissions and emissions of nitrogen oxides.

An exemplary embodiment of the invention will be described in greater detail below with reference to the drawings:

DETAILED DESCRIPTION OF AN EMBODIMENT

Figure 1:
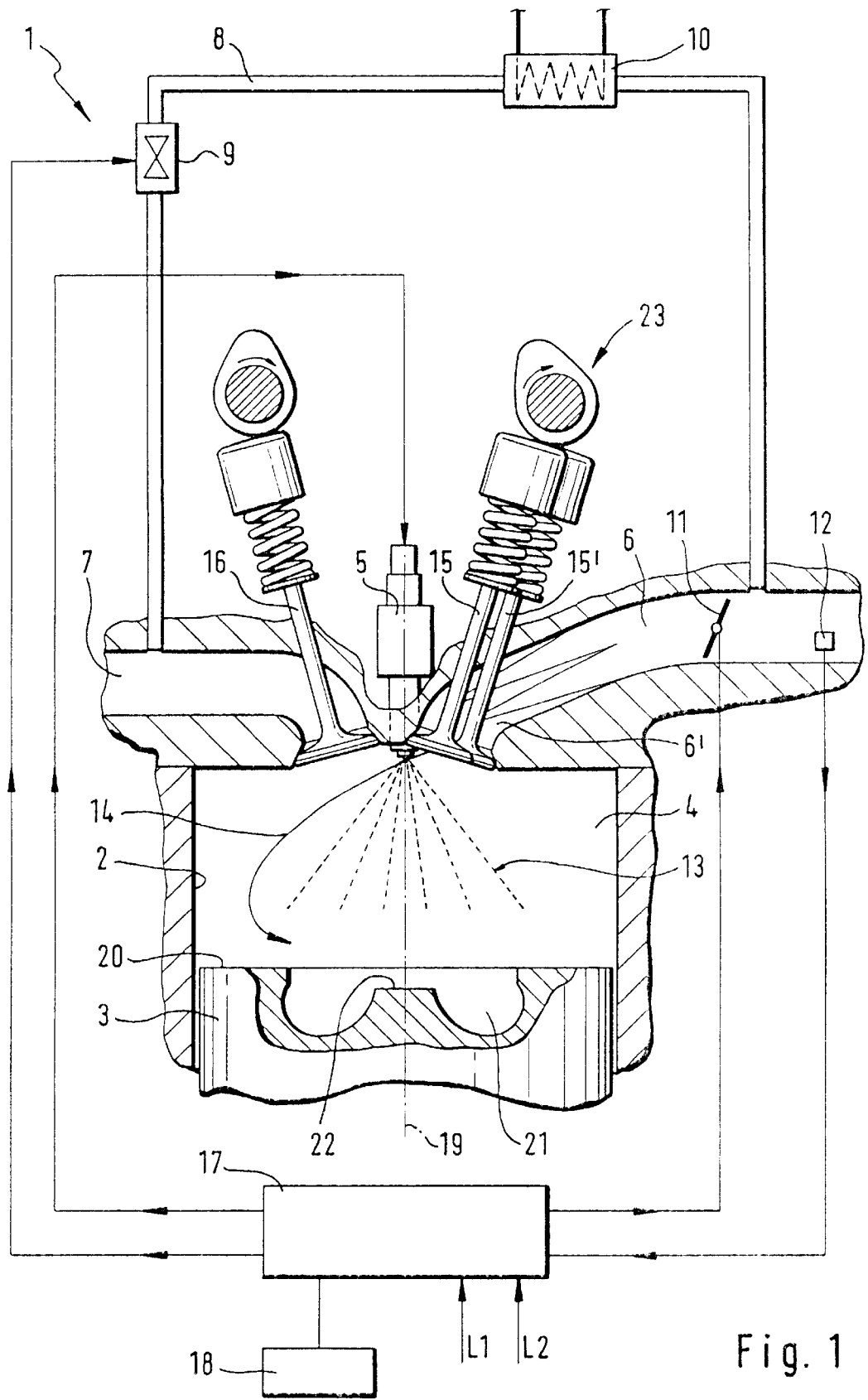
FIG. 1 is a schematic cross sectional view of a diesel internal combustion engine.

The diesel internal combustion engine 1 illustrated in FIG. 1 comprises a plurality of cylinders 2, in each of which a piston 3 arranged in such a way that it can move longitudinally delimits into the combustion space 4. Fuel is injected directly into the combustion space 4 by an injector 5 and is burnt with combustion air fed in separately through an inlet duct 6. After combustion, the exhaust gases are discharged via an exhaust duct 7. The inlet ducts 6 and the exhaust ducts 7 are opened and closed by engine valves 15, 15', 16, which are controlled positively in the customary manner by a valve operating mechanism 23. The injector 5 and the valve members of the engine valves 15, 15', 16 are arranged essentially in a common plane that lies adjacent to the inner surface of a cylinder head, and extends approximately normal to the cylinder axis 19.

The exhaust duct 7 and the inlet duct 6 are inter-connected by an exhaust-gas recirculation line 8, which can be opened by an exhaust-gas recirculation valve 9 with an adjustable cross section of passage. An inter-cooler 10 is arranged in the exhaust-gas recirculation line 8, with the result that the recirculated flow of exhaust gas is cooled before it is mixed with the fresh air. The injector 5 is part of a common-rail injection system (not shown here), in which the injectors of all the cylinders are supplied with fuel from a common high-pressure line. The injector 5 produces a fuel jet 13 with a plurality of individual jets that are precisely determined geometrically. The fuel jet injected into the combustion air produces a cloud of fuel containing extremely finely divided fuel droplets in the combustion space.

To improve mixture preparation, a piston recess 21, which forms part of the combustion space 4, is formed in the piston head 20 of the piston 3. The piston recess 21 is toroidal and surrounds an impact surface 22, which is arranged in the center of the piston head 20 and rises from the recess.

The injector 5 is controlled by a control unit 17, which determines the injection parameters, in particular the injection point and the injection rate (quantity injected), as a function of the operating point of the internal combustion engine. To determine the operating point of the internal combustion engine, two continuously measured parameters L1 and L2, i.e. the quantity injected L1 (or the electronic equivalent) and the speed L2 of the internal combustion engine are input into the control unit. As a further input variable, the control unit 17 receives the signal of a flow meter 12 in the inlet duct 6. In this context, it is the mass flow of the combustion air entering the combustion space 4 that is measured.

According to the invention, a homogeneous fuel/air mixture in the combustion space is formed in such a way that the homogenization is largely complete before the spontaneous ignition of the mixture. This is achieved by virtue of the fact that the combustion air is admitted to the combustion space 4 in a swirling flow 14 of adjustable swirl intensity about a longitudinal axis 19 of the cylinder. The swirl momentum is imparted to the combustion air by shaping the inlet duct and/or by the shape and position of the inlet valve 15 and can be adjusted by means of a control element that acts in the inlet duct 6 on the flow of the combustion air. In the present case, the control element is a control flap 11, which is arranged in the inlet duct 6 in such a way as to be pivotable about a center line. However, other elements can also be used to adjust the air flow and impart an adjustable swirl momentum to the combustion air in accordance with the invention. Each cylinder 2 comprises two separate inlet ducts 6, 6', a control flap 11, which exerts a throttling action on the air flow in the inlet duct 6 as a function of its position, being provided in only one predetermined inlet duct 6.

The control unit 17 includes a performance graph 18, in which predetermined settings for the exhaust-gas recirculation valve 9, the control flap 11 and the injection parameters for the injector 5 are stored for access when required. Via the swirl intensity of the combustion air flow and the injection parameters, the control unit 17 controls for the respective engine operating point the optimum homogenization of the fuel/air mixture formed in the combustion space 4. At each engine operating point, the optimum exhaust-gas recirculation rate is also set by means of the exhaust-gas recirculation valve 9, thereby mixing the exhaust gas with the fresh air in a ratio such that a desired fuel/air ratio is formed in the combustion space 4. By means of cooled exhaust-gas recirculation in combination with a control of the movement of the air in the combustion space (swirling flow 14) and the quantity of fuel injected, the air ratio is set to an optimum value at each operating point of the internal combustion engine, with air ratios as close to the stoichiometric air ratio as possible. In conjunction with the homogenization of the mixture, very low nitrogen oxide and particulate emissions can be achieved in this way.

Figure 2:
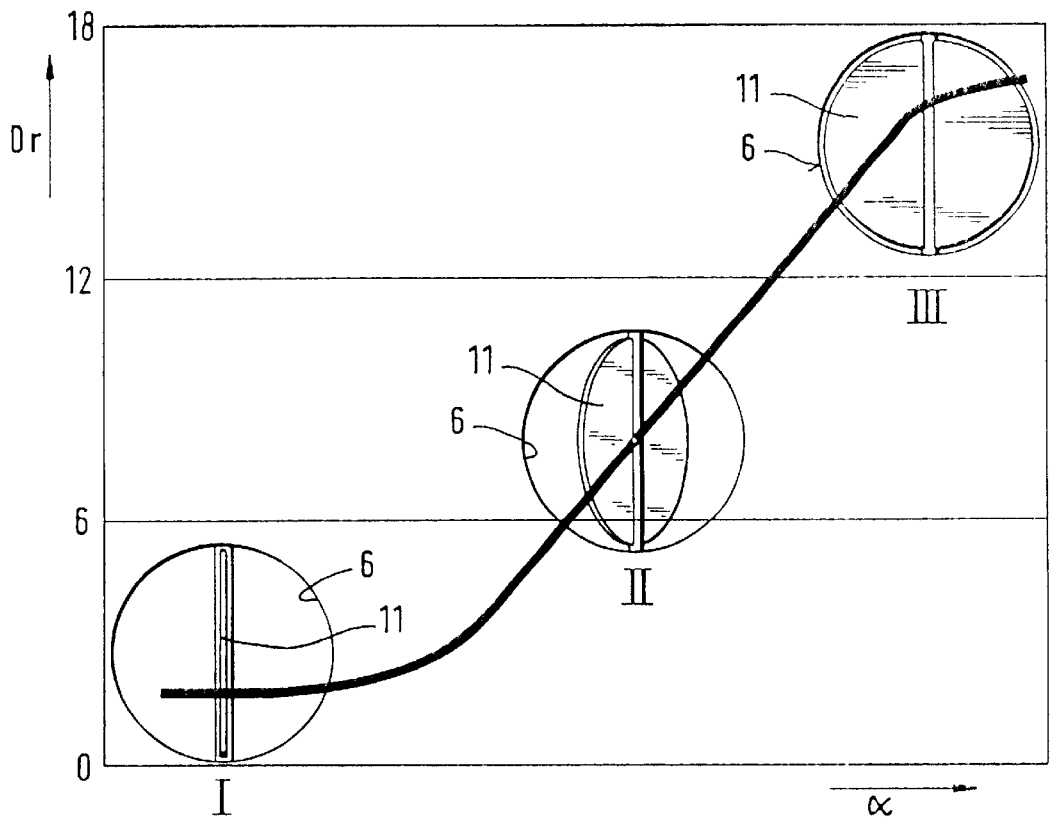
FIG. 2 is a graphical representation of the adjustment angle of the control flap with the corresponding swirl intensities.

FIG. 2 is a graphical representation of the opening angle α of the control flap 11 in the inlet duct 6 and of the swirl intensity Dr that can be achieved with the corresponding setting of the control flap 11. With the control flap completely open (position I), the effect of the control flap 11 on the combustion air flow is slight and the basic momentum involving a low swirl intensity is imparted to the combustion air flow upon entry to the combustion space. With an increasing angle of incidence α, the swirl intensity Dr can be set in a variable manner in accordance with the current operating point according to a largely linear control characteristic. Accordingly, the maximum swirl intensity Dr is obtained when the control flap 11 is closed (position III).

The method according to the invention allows the diesel internal combustion engine to be operated close to the stoichiometric air ratio, making it possible to achieve very low particulate and nitrogen oxide emissions. At least in certain ranges, the diesel internal combustion engine is operated with a homogeneous mixture. It is possible to switch to conventional diesel combustion methods involving heterogeneous combustion.

Figure 3:
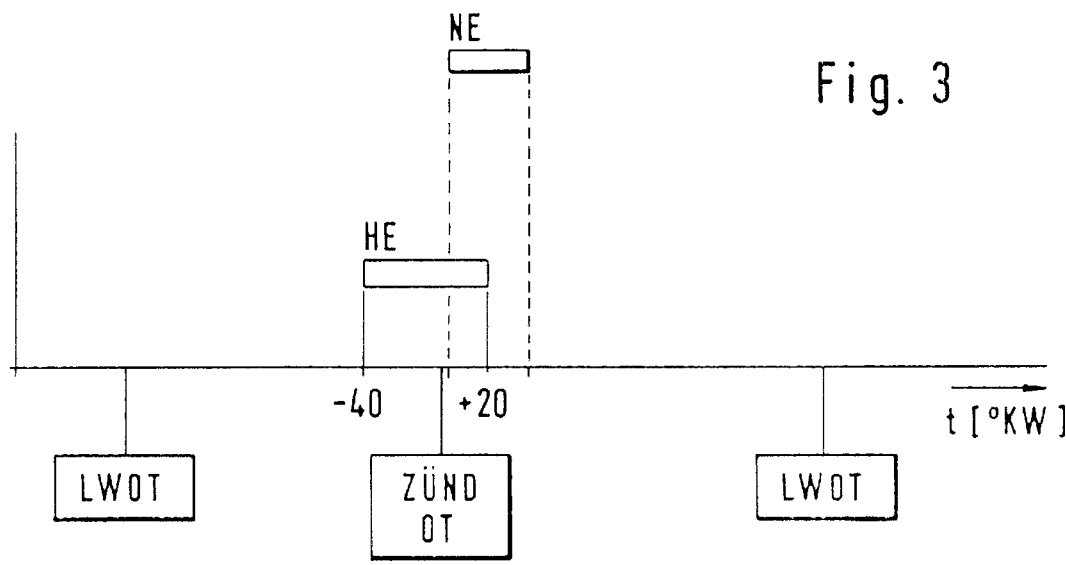
FIG. 3 is a graphical representation of the timing of the injections based on the crank angle.

Based on the presets of the characteristic-map memory 18, the control unit 17 furthermore controls the balance of conversion during combustion in the combustion space by adjusting the injection point, the air ratio and the swirl intensity as a function of the operating point with a view to reducing exhaust emissions. The advantageous time windows for injection are shown schematically in FIG. 3. The majority of the total mass of fuel to be metered in per working cycle is introduced into the combustion space during a main injection HE, the start of injection taking place in a range approximately between 30–40° of crank angle before the top dead center of the piston movement and approximately 10–20° of crank angle after top dead center. Injection is completed before the spontaneous ignition. To ensure post-oxidation of unburnt exhaust gases, such as hydrocarbons and carbon monoxide and particulates, a staggered after injection NE can be performed after the main injection HE, wherein a smaller proportion of the total quantity is injected than during the main injection HE. The after injection begins between 0° of crank angle and about 30–40° of crank angle after the ending of the main injection and initiates afterburning.

What is claimed is:

1. A method of operating a Diesel internal combustion engine including a cylinder with a combustion space delimited in the cylinder by a cylinder head, and a piston with a crank mechanism for operating the piston, the cylinder head further including air inlet and exhaust gas outlet passages with engine inlet and outlet valves, a fuel injector for injecting fuel into the combustion space and a flow control valve arranged in said air inlet passage, said method comprising the steps of admitting combustion air to said combustion space in a swirling flow pattern about the axis of said cylinder and injecting a quantity of fuel into the combustion space in an injection pattern controlled by a control unit for mixing with the combustion air and also controlling the swirling flow pattern in said cylinder by controlling said flow control valve in coordination with the fuel injection quantity into said combustion space to form a predetermined fuel/air mixture pattern as a function of the instant engine operating point, at least in certain engine operating ranges, in which a largely homogeneous mixture is to be formed in the combustion space before a spontaneous ignition of the mixture occurs.

2. A method according to claim 1, wherein the fuel is injected by a main injection in each working cycle of the respective cylinder.

3. A method according to claim 1, wherein the control unit determines the injection point and the quantity of fuel to be injected.

4. A method according to claim 3, wherein the fuel is injected essentially in a continuous injection process of the injector.

5. A method according to claim 4, wherein the injection process begins in a time window between 40° of crank angle before top dead center of the crank mechanism and about 20° of crank angle after top dead center.

6. A method according to claim 3, wherein the main fuel injection is followed by a staggered after-injection, in which a smaller amount of fuel is injected than in the main injection.

7. A method according to claim 1, wherein said flow control valve is adjusted so as to provide a swirl intensity of the swirling flow in at least one inlet duct of each cylinder.

8. A method according to claim 1, wherein a specified air ratio of the fuel/air mixture is set in the combustion space by recirculating exhaust gas into the inlet duct with an adjustable recirculation rate.

9. A method according to claim 8, wherein the exhaust gas is recirculated at rate providing for an air ratio specified for the respective engine operating point.

10. A method according to claim 9, wherein an air ratio in the vicinity of the stoichiometric value is set at least in certain operating ranges of the internal combustion engine.

11. A method according to claim 1, wherein the fuel injection control unit adjusts the fuel injection quantity and the swirling flow pattern so as to cause combustion of the fuel by coordinated adjustment of the injection point, the swirl intensity of the swirling flow and the air ratio at a point predetermined as a function of the engine operating point.

12. A method according to claim 1, wherein a certain combustion pattern and a certain pressure gradient are generated in the combustion space by said control unit as a function of the engine operating point by respective adjustments of the air ratio and the swirl intensity.

* * * * *